June 26, 1923.

J. W. KAGER

RADIATOR HOLDER

Filed Nov. 19, 1921

1,460,344

WITNESSES
Frederick Diehl

INVENTOR
JASPER W. KAGER
BY
ATTORNEYS

Patented June 26, 1923.

1,460,344

UNITED STATES PATENT OFFICE.

JASPER W. KAGER, OF BUTTE, MONTANA, ASSIGNOR TO KAGER AUTOMOBILE RADIATOR HOLDER COMPANY, A COPARTNERSHIP CONSISTING OF JASPER W. KAGER, SAMUEL BARKER, ALEXANDER LEVINSKI, AND HENRY C. LEVINSKI.

RADIATOR HOLDER.

Application filed November 19, 1921. Serial No. 516,352.

*To all whom it may concern:*

Be it known that I, JASPER W. KAGER, a citizen of the United States, and a resident of Butte, in the county of Silver Bow and State of Montana, have invented a new and Improved Radiator Holder, of which the following is a description.

My invention relates to means for holding a radiator in the manufacture or the repair of the same, and has for its general object to provide a holding means for the indicated purpose, so constructed and arranged that the radiator may be turned in its own plane or rocked vertically, whereby to dispose the radiator in various angular positions to make all points thereof readily accessible.

The nature of the invention and its distinctive features and advantages will clearly appear as the description proceeds.

Reference is to be had to the accompanying drawings forming a part of this specification, it being understood that the drawings are merely illustrative of one example of the invention.

Figure 1:
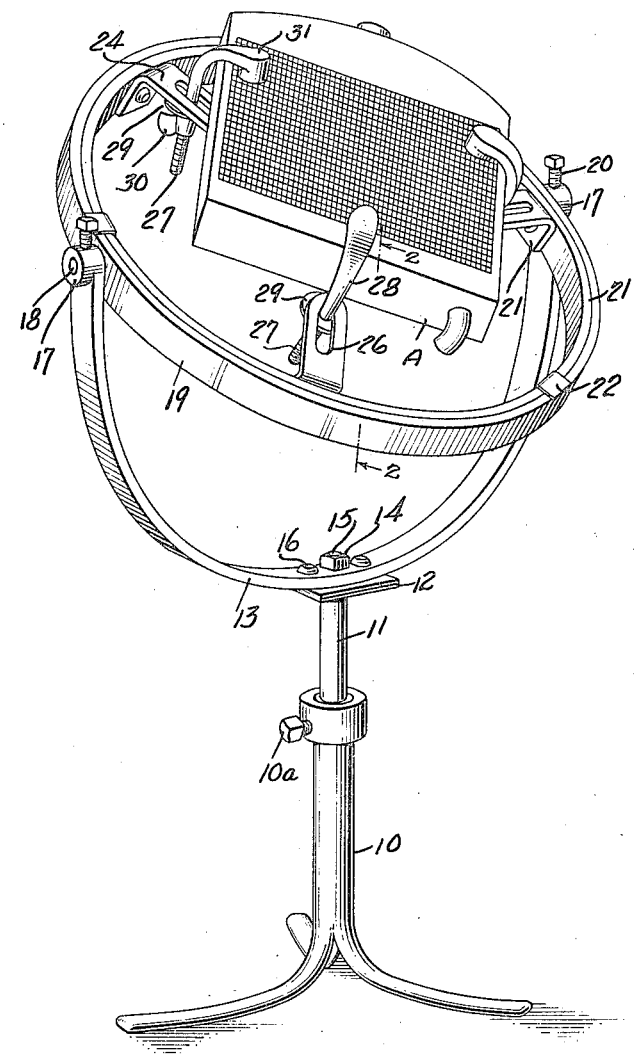
Figure 1 is a perspective view of a radiator holder embodying my invention, showing a radiator clamped therein.
Figure 2:
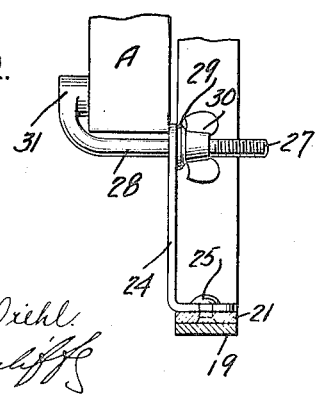
Figure 2 is a detail in transverse vertical section as indicated by the line 2—2 Figure 1.
Figure 3:
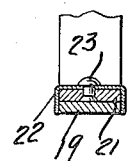
Figure 3 is a cross section through the annular frame and ring.

In carrying out my invention in accordance with the illustrated example, a stand 10 is provided, adapted to receive a standard 11 having a head 12 to which a stirrup-like yoke 13 is secured, there being employed for the purpose in the illustrated example a nut 14 on the reduced threaded upper end 15 of the standard and stud bolts 16 or the like. The upper ends of the arms of yoke 13 are formed with bearings 17 to receive the trunnions 18 on an annular frame 19 permitting said ring frame to rock in a vertical plane, set screws 20 being provided in said bearings to hold the trunnions 18 against turning in disposing the frame 19 in adjusted angular position. Snugly fitting within the annular frame 19 is a turnable ring 21 which is held against displacement in the frame 19 by clips 22 secured by rivets 23 to said ring.

Holding means for the radiator is provided within the ring 21. A series of angle brackets 24, three of which are employed in the present instance, are suitably secured as by rivets 25 to said ring 21, one arm of each angle bracket being directed laterally inward and formed with longitudinal slots 26 through which threaded shanks 27 of clamps 28 extend. The shanks 27 have washers 29 and nuts 30, preferably wing nuts thereon, at the under side of the brackets 24. The upper ends of the clamps 28 are directed laterally and terminate in clamp heads 31 adapted to be disposed over a radiator 31 or swung away from the radiator. The radiator A is adapted to be raised on the brackets 24 and with the clamp heads 31 turned over the radiator, the screwing up of the nuts 30 will firmly clamp the radiator to the brackets.

With the described arrangement the standard 11 is raised the desired height in the stand 10 and fastened by the set screw 10$^a$ provided on said stand. The radiator having been clamped in position, the ring 21 may be freely turned to the right or left within the annular frame 19 thereby turning the radiator A in its own plane. Also, the frame 19 with the ring 21 and the radiator may be rocked on the trunnions 18 and then fastened in any given position, if desired, by the set screws 20. Thus, all parts of the radiator may be readily reached for performing any necessary operations thereon.

The slots 26 permit the radial adjustment of the clamps 28 to accommodate radiators of different sizes.

I would state in conclusion that while the illustrated example constitutes a practical embodiment of my invention, I do not limit myself strictly to the exact details herein illustrated, since, manifestly, the same can be considerably varied without departure from the spirit of the invention as defined in the appended claims.

Having thus described my invention, I claim:

1. A holder of the class described including a stand, a vertically adjustable standard thereon, a stirrup-like yoke carried by said standard and presenting bearings at its upper end, an annular frame having trunnions in said bearings to adapt the frame to rock vertically, a ring turnably fitting within said frame, means to hold said ring against displacement in the frame, and clamp means within said frame to hold a radiator.

2. A holder of the class described including a rockably supported annular frame, a ring revolubly supported in said frame, and clamp means disposed on said ring at the interior at different points around the ring.

3. A holder of the class described including a rockably supported annular frame, a ring revolubly supported in said frame, brackets on said frame presenting arms formed with slots and disposed radially with respect to the ring, and clamp shanks adjustable in said slots and formed with laterally disposed clamping heads, said brackets being adapted to receive a piece of work, and said clamps being adapted to hold the work on the brackets.

4. A holder of the class described, comprising a stand, a substantially U-shaped member mounted on said stand and turnable on a vertical axis thereon, and a ring to clamp a work mounted on said U-shaped member, said ring being rockable on said member on a horizontal axis.

5. A holder of the class described, comprising a stand, a rod telescoping within said stand, means for holding said rod at various positions therein, a U-shaped member turnably carried on said rod, an annular frame rockably carried on said U-shaped member, a ring provided with clamping means adapted to receive a radiator supported on said frame, and means for interlocking said ring to said annular member.

JASPER W. KAGER.